Figure 1:

Oct. 15, 1929.   J. M. OLIN ET AL   1,732,211
SMALL CALIBER RIFLE BULLET AND PROCESS OF MAKING THE SAME
Filed Oct. 14, 1925   2 Sheets-Sheet 1

Inventors:
John M. Olin and Alfons G. Schuricht,
By John N. Bruninga
Their Attorney.

Oct. 15, 1929.  J. M. OLIN ET AL  1,732,211
SMALL CALIBER RIFLE BULLET AND PROCESS OF MAKING THE SAME
Filed Oct. 14, 1925  2 Sheets-Sheet 2
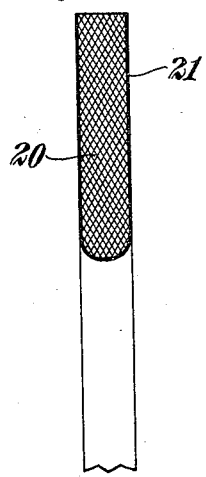
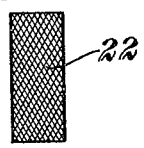
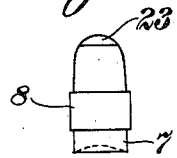
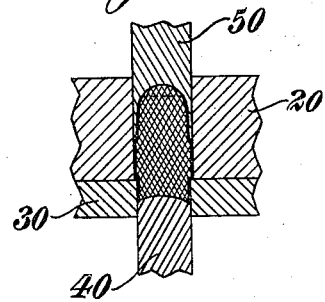
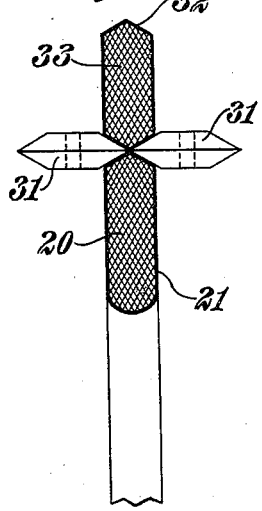
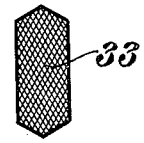
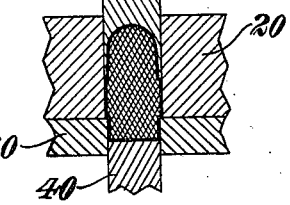
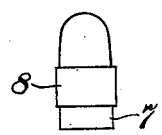
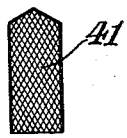
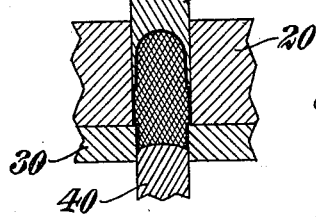
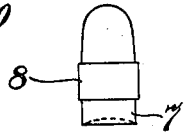
Inventors:
JOHN M. OLIN AND ALFONS G. SCHURICHT,
By John N Buminga
Their Attorney.

Patented Oct. 15, 1929

1,732,211

UNITED STATES PATENT OFFICE

JOHN M. OLIN AND ALFONS G. SCHURICHT, OF ALTON, ILLINOIS, ASSIGNORS TO WESTERN CARTRIDGE COMPANY, OF EAST ALTON, ILLINOIS, A CORPORATION OF DELAWARE

SMALL-CALIBER RIFLE BULLET AND PROCESS OF MAKING THE SAME

Application filed October 14, 1925. Serial No. 62,483.

This invention relates to rifle bullets, and more particularly to bullets of the small caliber type. This application is a continuation in part of application Serial No. 62,104 filed October 12, 1925, as to subject-matter common to the applications.

In a small caliber rifle cartridge (such as 22 caliber, which is of the rim-fire type), an ordinary lead bullet is used, the base of which is reduced to fit the cartridge shell while the part projecting from the shell remains enlarged to provide a driving part fitting the rifling. The ordinary small caliber lead bullet is coated with a lubricating compound in order to prevent fouling of the rifle barrel with lead. This lubricant in the form of grease as now employed is, however, deposited not only in the barrel but also in the working parts, especially of repeating rifles, thereby preventing proper functioning. Moreover foreign particles, such as dust, dirt and grit, have a tendency to adhere to the grease lubricated bullets, especially when they are carried around in pockets or are kept in uncovered boxes, as is frequently the case; the dust and grit picked up by the bullet not only affect the accuracy of the bullet itself but also affect the accuracy of the fire arm as the grit has an erosive action on the barrel. Furthermore a lead bullet, even if grease-lubricated has a tendency to "lead" the bore of a rifle in which it is fired, and this is aggravated if the grease is rubbed off, as when carried loose in the pocket of the user of the arm.

As a result, therefore, small caliber rifles do not have the accuracy as is the case with rifles of larger caliber where jacketed bullets may be employed. The ordinary jacketed bullet (in which the jacket is preformed and the lead core inserted) is, however, impractical for low-power (small caliber) ammunition not only on account of the high cost required for its production, but also on account of the fact that the necessary base reduction to fit the shell of such a low-power cartridge has not been readily obtainable; for the drawing of such a small jacket of the required form is an exceedingly difficult, if not impractical, operation. Moreover, a preformed jacket requires the core to be inserted therein, and this must be followed by subsequent re-forming to conform the bullet to the rifling and to balance the same; this is a rather difficult operation and expensive, on account of the small dimensions of a small caliber rifle bullet, such as designed for .22 caliber rifles. Such bullets must, of course, be sold at a low price so that expensive operations must be avoided. Moreover, with a pre-formed jacket, the specific gravity of such a small caliber bullet will be reduced so as to require modification of its dimensions, which is undesirable; and it must be understood that a high specific gravity is essential in such a bullet in order that it may have the penetrative power resulting from the storing of energy therein, which varies directly as the mass of the bullet. If it is attempted to use a core of a lower specific gravity than lead, then the same objections are encountered, but to a greater extent.

Small caliber rifle bullets, especially those of the rim fire type, are of smaller diameter at the base or heel than at the driving band; accordingly, upon firing of the powder charge, the pressure exerted by the gases causes the bullet to expand, more particularly at the base or heel, so that it fills the bore of the rifle.

One of the objects of this invention, therefore, is to provide a small caliber rifle bullet which is so constructed and formed as to avoid the objectionable features pointed out heretofore.

Another object of this invention is to provide a small caliber rifle bullet embodying a core of a high specific gravity metal, such as lead, having directly deposited thereon a metallic sustaining and lubricating plating of sufficient thickness and stability to provide a jacket, the plating thickness being, however, kept down, so that the specific gravity of the bullet is substantially maintained.

Another object is to provide a small caliber rifle bullet, in which the thickness and stability of the plating is secured, particularly at the driving part, as by continuing the deposit to an extent sufficient in order that the bullet may take the rifling.

Another object is to provide a small caliber rifle bullet in which the lubricating plating is of sufficient thickness and stability to permit working thereof while the plating is condensed and homogenized, more particularly at the driving part or band of the bullet.

Another object is to provide a small caliber rifle bullet, in which the deposit-plated core is formed and sized particularly at the driving part to fit and take the rifling.

Another object is to provide a small caliber rifle bullet of the character described, in which the deposit-plated lead core is not only formed at the driving part, but also at the base or tail and even forward of the driving part along the point.

Another object of this invention is to provide a deposit plated small caliber rifle bullet in which the plating is made thin enough to permit the bullet to expand, particularly at the base or heel, to take the rifling and to fill the bore.

Another object is to provide a process of making such a bullet whereby it may not only be economically produced but so formed as to secure the desired conformation and effect.

Further objects will appear from the detail description taken in connection with the accompanying drawings in which are disclosed illustrative embodiments of this invention; it will, however, be understood that this invention is susceptible of various embodiments both as a bullet and in its process of manufacture.

In the accompanying drawings

Figure 2:
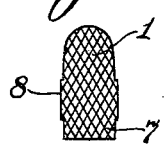
Figure 3:
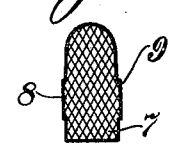
Figure 4:
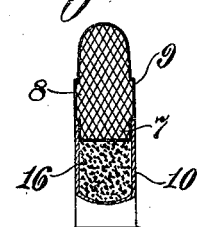
Figure 5:
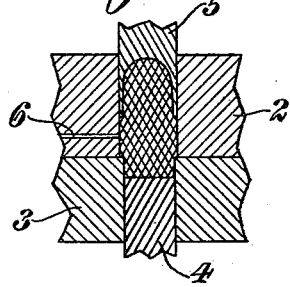
Figure 6:
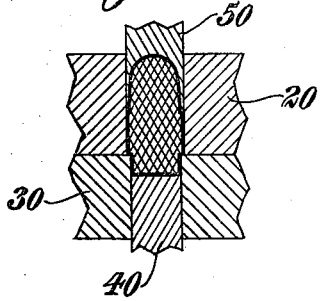

Figures 1 to 6 inclusive are views illustrating steps of producing a bullet embodying this invention and in accordance with one embodiment of this invention, Figures 1, 2, 3 and 4 illustrating the slug in its different stages of manufacture, and Figure 4 illustrating the bullet as mounted in its cartridge shell, while Figures 5 and 6 illustrate swaging dies operating on the slug;

Figures 7 to 12 inclusive are views similar to Figures 1 to 6 inclusive but illustrating another embodiment of this invention;

Figures 13 to 16 inclusive are similar views illustrating still another embodiment of this invention;

Figures 17 to 20 inclusive are similar views illustrating still another embodiment of this invention;

Figures 21 to 23 inclusive are similar views illustrating still another embodiment of this invention.

Generally stated, in accordance with this invention, a metallic plating is deposited on the slug and this slug may be either partially formed as by casting or otherwise, or completely or incompletely formed as by swaging. The slug may have the usual lead body but it may be of any other suitable metal or alloy of high specific gravity as required or desired. The plating may be a suitable metal or alloy, preferably of a metal or alloy having lubricating qualities; thus a lead slug plated with copper forms a suitable projectile; however, alloys of copper, such as copper and zinc, copper and tin, copper and nickel, etc. may be employed. Moreover the plating may be of any suitable metal, such as tin, nickel, zinc, etc. The plating may cover the core or slug wholly, at the point and base or tail as well as at the driving part or band; or it may cover it only partially so as to form a soft-nosed bullet. The base end of the bullet may moreover be square or concave and this end may be plated or left unplated. The plating may be deposited in any suitable manner; thus the most economical process giving the best results is an electro-deposition of the plating; however, good results are also obtained by plating in accordance with other processes, such as by spraying, dipping, etc. Moreover the plating may be metal in a finely divided condition carried by a suitable vehicle, such as lacquer or varnish which may be applied by spraying, dipping or in any other suitable manner. In accordance with this invention, therefore, the plating is deposited directly on a lead slug and this deposit is continued until the plating is of sufficient thickness and stability to provide a jacket, and more particularly at the driving part so as to enable it to take the rifling.

The deposit of a plating, such as copper, on a lead slug, especially when this lead slug has been previously formed to finished shape by swaging, secures a practical bullet; however, owing to the crystalline nature of the deposited metal there may be a tendency for the latter to break off at the crystal boundaries and along the lines of cleavage when the projectile passes through the bore of the gun. This breaking off of the plating may tend to foul the rifle after firing a number of rounds. In accordance with another embodiment of this invention, therefore, the plated slug as described above is subjected to mechanical working. This may be accomplished by again swaging the plated bullet in a closed die. As hereinafter described, however, the plating can be deposited on a roughly formed or even an unformed slug and the plated slug is then formed to shape while the plating is worked to secure the required physical condition. Moreover as hereinafter described the bullet may be formed from slugs severed from a plated wire. In accordance with this invention, the deposited plating is condensed and homogenized, more particularly at the driving part, and the plated slug is also formed at the driving part to fit the rifling, although the slug may also be formed at the base or tail to balance the bullet and even at the point. The metal plating is, therefore, put in a condition similar to that of a drawn bullet jacket and gives increased accuracy over that of ordinary grease lubricated bullets. In fact, a small caliber rifle bullet produced in accordance with this invention has the advantageous features of the usual large caliber bullet having a pre-drawn jacket, as previously described; for the formation and sizing of the deposit plated-core cannot only be secured at the driving band, but also at the base and even at the point.

Referring now to the accompanying drawings, and more particularly to the embodiment illustrated in Figures 1 to 6 inclusive, 1 designates a slug which may be formed by casting or in any other suitable manner and which is preferably formed of lead and of a volume which is preferably somewhat in excess of the volume of the completed bullet. Such a slug is then placed in a swaging die, as shown in Figure 5, having dies 2 and 3 and formers 4 and 5, the die 2 being also provided with a vent 6. The dies and formers are so shaped as to give the desired conformation to the slug as shown in Figure 2 in which the slug has a reduced base 7, an enlarged driving part or band 8 and a nose of suitable shape. By the operation of the formers 4 and 5, the desired shape and volume are given to the slug, any excess metal passing out through the vent 6 while the sprue so formed will be sheared off by moving the bullet upwardly out of the die through the medium of the former 4.

The slug formed as shown in Figure 2 is now plated in any suitable manner and with any suitable metal, such as copper, this plating being shown at 9 as completely enveloping the slug. Where the plating is secured by electro-deposition of the metal, it may be accomplished in a tumbling barrel, whereby the plating of any desired thickness may be economically secured.

The plated slug as shown in Figure 3 is now placed in a second swaging die, Figure 6, which is of similar construction as that shown in Figure 5, except that the vent 6 is omitted; accordingly similar parts are indicated by similar reference characters as in Figure 5 with "0" added. In this second swaging operation the plating is condensed and smoothed so as to not only secure the desired conformation, but so as to also condense the plating metal, especially at the driving part 8. This result can be secured in various ways. Preferably the swaging die, Figure 5, is of such form as to produce a slug which is longer than the bullet but in which the diameter is below that of the complete bullet so that the slug will be undersized but so that the volume of the plated slug, Figure 3, will be that of the complete bullet, Figure 4. When now the slug, Figure 3, is placed in a swaging die, Figure 6, and operated upon by the formers, the plated slug will be compressed endwise so as to diametrically expand the same, especially at the driving part 8 against the surrounding walls of the die and also of the punch. This will not only elongate the plating circumferentially but will also compress the same in order to secure the required density and surface smoothness. The bullet will, therefore, be of the required finished diameter not only at the driving part 8 but also at the reduced part 7. It is not, however, necessary to provide a vent in the swaging die 6 since the plating has been of an undersized slug plated to an extent sufficient to form a volume substantially equal to that of the finished bullet, which plated slug is then formed to the size volume and weight of the finished bullet; accordingly there is no excess metal which need be extruded. Accordingly the entire outer cylindrical surface of the bullet and especially that of the driving part 8 is left smooth.

In accordance with another embodiment of this invention, however, the formation of the slug, Figure 2, and the plating thereof, Figure 3, is such that the diameter of the slug, Figure 3, will be slightly larger than that of the finished bullet; the volume is, however, that of the finished bullet. When a slug of such a character is placed in a swaging die, Figure 6, and forced therein the plating will be compressed as well as wiped, especially at the driving part 8 so as to secure the desired density and uniformity of the plating as well as smoothness of the outside surface.

Figure 7:
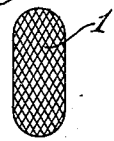
Figure 8:
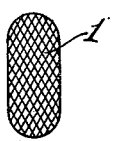
Figure 9:
Figure 10:
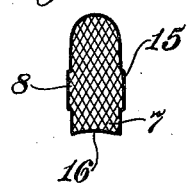
Figure 11:
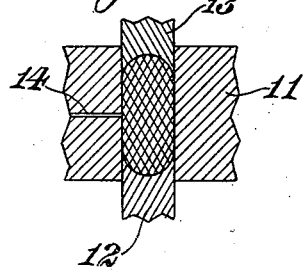
Figure 12:
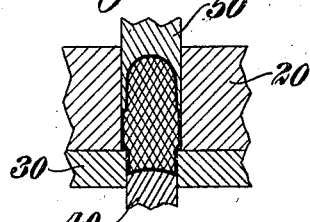

In accordance with another embodiment of this invention as illustrated in Figures 7 to 12 inclusive, the slug 1, Figure 7, may be produced in any suitable manner as by casting. This slug is then placed in a swaging die 11, Figure 11, provided with formers 12 and 13 and a vent 14. This swaging die forms a slug, Figure 8, of a volume slightly less than that of the complete bullet but preferably of a diameter somewhat less than and of a length somewhat greater than that of the finished bullet, any excess being extruded through the vent 14, and the sprue being cut off in a manner heretofore described by the upward movement of the former 12. The slug is then provided with a plating 15 of copper or any other suitable metal and this plating may be secured as heretofore described. Preferably, however, the diameter of the plated slug, Figure 9, is less than that of the driving part of the finished bullet and preferably even less than the diameter of the base 7 of the finished bullet, while the volume of the plated slug is substantially that of the finished bullet. The plated slug, Figure 9, is now placed in a swaging die, Figure 12, which may be of the same construction as shown in Figure 6 and, therefore, referred to by similar reference numerals. The operation of the formers is such as to produce a bullet as shown in Figure 10 and it will be particularly noted that the endwise compression of the slug causes the same to expand diametrically, especially at the driving part 8, so that the plating there is especially condensed as well as tensioned to secure a dense and uniform as well as a smooth surface plating. The bottom former 40 may be provided with a convex face so as to secure better and more efficient flow of the metal in the formation of the bullet and so as to secure a concave face 16 at the base of the bullet.

Referring now to the embodiment illustrated in Figures 13 to 16 inclusive, 20 designates a wire which may be of lead or any other suitable metal or alloy and which may be provided with a plating 21 of copper or any other suitable metal or alloy. This plated wire may be commercially formed in any suitable manner as by electro-plating, dipping or spraying; it is, however, desirable to obtain a uniform plating. This plating may moreover be condensed or finshed preparatory to the severing of slugs therefrom as hereinafter described, and this condensation and smoothing may be obtained by any suitable metal working means, such as rollers. A slug 22 is severed from the plated wire 20 in any suitable manner as by means of shears or cutters, and in Figure 14 a square ended slug is illustrated. The plated wire 21 employed preferably has an outside diameter which is less than that of the driving part 8 of the finished bullet, Figure 15, and is preferably even slightly less than the base 7 of the finished bullet; the volume is, however, substantially that of the finished bullet. This slug, Figure 14, is now placed in a swaging die which is like that shown in Figure 12 and, therefore, referred to by similar reference characters. In the swaging operation the bullet is formed to finished size and weight and during the endwise compression, the slug will become circumferentially expanded, especially at the driving part 8, so as to condense and smooth the plating. The lead core of the slug will, however, be forced out so as to form a soft nose 23, Figure 15.

In accordance with still another embodiment of this invention as illustrated in Figures 17 to 20 inclusive, the slugs 33 are severed from the plated wire by rotating cutters 31 so as to turn the plating over the ends of the slug as shown at 32. This slug is also formed of a diameter and volume corresponding to that of Figure 14 so that the diameter will be even slightly less than that of the base 7 of the finished bullet. The slug 33, Figure 18, is now placed in a forming die, which is like that shown n Figure 6, and formed to finished shape as shown in Figure 20. By closing the ends of the slug 33 during the cutting operation, the finished bullet will contain a plating completely enveloping the same. In Figures 21 to 23 inclusive the plating is turned over only one end of the slug 41 while the other end is cut off square. When the bullet is formed as shown in Figure 22, the nose will be closed while the base will be open and concave as shown in Figure 23.

In accordance with this invention, the deposit is continued to a plating thickness and stability to secure the desired result. Thus on a .22 caliber bullet the plating need only have a thickness of about .0003 inch; however, a plating of .005 inch is entirely practical. The finished bullet may have a diameter slightly in excess of that of the rifle; thus in a .22 caliber bullet the diameter of the driving band may be .221 inch.

It will, therefore, be seen that the invention accomplishes its objects. A small caliber rifle bullet is provided in which high accuracy may not only be obtained but also maintained. The formation of the bullet itself permits not only accuracy of the bullet itself but also accuracy in the flight thereof from the rifle to the target due to the fact that the bullet itself is formed to fit the rifling as well as the loaded shell of the cartridge.

In Figure 4 the cartridge is shown as of the small caliber rim-fire type comprising a shell 10 into which the reduced base 7 of the plated bullet fits and this shell is provided with a propellant charge 16 and has a rim-fire base 17 containing a primer, such as fulminate of mercury. Fouling of the rifle barrel is materially reduced and in fact obviated by the employment of a lubricating plating as distinguished from a grease or the like as heretofore used in small caliber rifle cartridges of the low-power rim-fire type. This plating is, however, so arranged that the bullet itself fits the rifling as well as the shell of the cartridge of which it forms a part. In accordance with this invention, the plating of substantial thickness and stability serves to stiffen the finished bullet to prevent deformation in the handling incident to loading the cartridge as well as loading in the rifle, while it furnishes lubricating means for the bullet as it passes through the barrel. The plating is, however, thin enough to permit the bullet to expand, particularly at the base or heel, to take the rifling and to fill the bore.

In the foregoing description and in the claims, the term "jacket" is used, not in a strictly technical sense, but rather in a descriptive sense, to define a sustaining plating which is directly deposited on a lead core and which is of sufficient thickness and stability to protect and sustain the lead core and to permit it to take the rifling. It should, however, be thin enough to permit the bullet to expand, particularly at the base or rear portion, to take the rifling and to fill the bore. This is accomplished by platings of the thickness and stability heretofore described. In this respect the plating of substantial thickness and stability distinguishes from a film applied to the core to merely prevent corrosion or to provide a burnished surface; as applied directly to a lead core, it also distinguishes from a coating over a drawn or preformed jacket or the soft nose of such a preformed jacketed bullet. It is further to be understood that the term "slug" is not to be limited to any partly formed projectile body but may include completely formed projectile bodies such as comprehended in accordance with embodiments of this invention.

It will be understood that certain features, sub-combinations and operations are of utility and may be employed without reference to other features, operations and sub-combinations; that is contemplated by and is within the scope of the appended claims. It is further obvious that various changes may be made in details, within the scope of the appended claims, without departing from the spirit of this invention; it is, therefore, to be understood that this invention is not to be limited to the specific details shown and described.

Various embodiments of the process described and shown herein are claimed specifically in applications, Serial Nos. 393,622; 393,623; 393,624; 393,625, filed September 19, 1929.

Having thus described the invention, what is claimed is:

1. A small caliber rifle bullet comprising, a lead core having directly deposited thereon a metallic sustaining and lubricating plating of sufficient thickness and stability to provide a jacket while the specific gravity of the bullet is substantially maintained.

2. A small caliber rifle bullet comprising, a lead core having directly deposited thereon a metallic sustaining and lubricating plating of sufficient thickness and stability at the driving part to take the rifling.

3. A small caliber rifle bullet comprising, a lead core which is enlarged to provide a driving band and having directly deposited thereon a metallic sustaining and lubricating plating of sufficient thickness and stability to take the rifling.

4. A small caliber rifle bullet comprising, a lead core having directly deposited thereon a metallic lubricating plating of sufficient thickness and stability at the driving part to permit working thereof, said plating being condensed and homogenized at the driving part of the bullet.

5. A small caliber rifle bullet comprising, a lead core having directly deposited thereon a metallic lubricating plating of sufficient thickness and stability at the driving part and base to permit working thereof, said plating being condensed and homogenized at the driving part and base of the bullet.

6. A small caliber rifle bullet comprising, a lead core having directly deposited thereon a metallic lubricating plating of sufficient thickness and stability at the driving part, base and point to permit working thereof, said plating being condensed and homogenized at the driving part, base and point of the bullet.

7. A small caliber rifle bullet comprising, a lead core which is enlarged to provide a driving band and having directly deposited thereon a metallic sustaining and lubricating plating, the plated driving band being formed and adapted to fit and take the rifling.

8. A small caliber rifle bullet comprising, a lead core which is enlarged to provide a driving band and having directly deposited thereon a metallic lubricating plating of sufficient thickness and stability to permit working thereof, the plated driving band being condensed and formed to fit and take the rifling.

9. In the art of making small caliber rifle bullets, the process comprising, depositing directly on a lead slug a metallic plating and continuing the deposite until the plating is of sufficient thickness and stability to provide a sustaining jacket.

10. In the art of making small caliber rifle bullets, the process comprising, depositing directly on a formed lead slug a metallic sustaining and lubricating plating and continuing the deposit until the plating is of sufficient thickness and stability at the driving part to take the rifling.

11. In the art of making small caliber rifle bullets, the process comprising, depositing directly on a lead slug a metallic plating and condensing the deposited plating, the deposit and condensation being continued until the plating is of sufficient thickness and stability to provide a sustaining jacket.

12. In the art of making small caliber rifle bullets, the process comprising, depositing directly on a lead slug a metallic plating of sufficient thickness and stability at the driving part to take the rifling and condensing the plating at the driving part.

13. In the art of making small caliber rifle bullets, the process comprising, depositing directly on a lead slug a metallic sustaining and lubricating plating of sufficient thickness and stability at the driving part to take the rifling and forming the plated slug at the driving part to fit the rifling.

14. In the art of making small caliber rifle bullets, the process comprising, depositing directly on a lead slug a metallic plating of sufficient thickness and stability to provide a sustaining jacket and forming the plated slug at the driving part and base.

15. In the art of making small caliber rifle bullets, the process comprising, depositing directly on a lead slug a metallic plating of sufficient thickness and stability to provide a sustaining jacket and forming the plated slug at the driving part, base and point.

16. In the art of making small caliber rifle bullets, the process comprising, depositing directly on a lead slug a metallic plating of sufficient thickness and stability to permit working thereof and condensing and homogenizing the plating.

17. In the art of making small caliber rifle bullets, the process comprising, depositing directly on a lead slug a metallic plating of sufficient thickness and stability to permit working thereof at the driving part and forming the plated slug at the driving part to fit the rifling.

18. In the art of making small caliber rifle bullets, the process comprising, depositing directly on a lead slug a metallic plating of sufficient thickness and stability to permit working thereof and subjecting the plated slug to the action of a die so as to condense and homogenize the plating.

19. In the art of making small caliber rifle bullets, the process comprising, depositing directly on a lead slug a metallic plating of sufficient thickness and stability to permit working thereof and condensing and homogenizing the plating by compression of the plated slug in a die.

20. In the art of making small caliber rifle bullets, the process comprising, depositing directly on a lead slug a metallic plating of sufficient thickness and stability to permit working thereof and compressing the plated slug endwise while confined cylindrically by a surrounding wall.

21. In the art of making small caliber rifle bullets, the process comprising, depositing directly on a diametrically undersized lead slug a metallic plating of sufficient thickness and stability to permit working thereof and compressing the plated slug endwise while confined cylindrically by a surrounding wall of the desired diameter.

22. In the art of making small caliber rifle bullets, the process comprising, depositing directly on a formed lead slug which is diametrically undersized at the driving band, a metallic plating of sufficient thickness and stability to permit working thereof and compressing the plated slug endwise while confined cylindrically at the driving band by a surrounding wall of the desired diameter.

In testimony whereof we affix our signatures this 3rd day of October, 1925.

JOHN M. OLIN.
ALFONS G. SCHURICHT.